(12) United States Patent
Huang et al.

(10) Patent No.: US 10,169,053 B2
(45) Date of Patent: Jan. 1, 2019

(54) LOADING A WEB PAGE

(71) Applicant: INTERNATIONAL BUSINESS MACHINES CORPORATION, Armonk, NY (US)

(72) Inventors: Wei Huang, Shanghai (CN); Yang Liu, Shanghai (CN); Qi Ruan, Ningbo (CN); Pei Wang, Shanghai (CN); Si Qi Zhong, Shanghai (CN); Xiao Wen Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 14/302,569

(22) Filed: Jun. 12, 2014

(65) Prior Publication Data
US 2014/0380147 A1 Dec. 25, 2014

(30) Foreign Application Priority Data
Jun. 20, 2013 (CN) .......................... 2013 1 0247605

(51) Int. Cl.
G06F 3/00 (2006.01)
G06F 9/451 (2018.01)

(52) U.S. Cl.
CPC .................................. G06F 9/451 (2018.02)

(58) Field of Classification Search
CPC ................................................... G06F 9/4443
See application file for complete search history.

(56) References Cited

U.S. PATENT DOCUMENTS

| | | | |
|---|---|---|---|
| 6,983,421 B1 | 1/2006 | Lahti et al. | |
| 7,949,960 B2 | 5/2011 | Roessler et al. | |
| 8,103,742 B1* | 1/2012 | Green ............... | G06F 17/30893 709/218 |
| 2005/0086608 A1 | 4/2005 | Roessler | |
| 2006/0149726 A1 | 7/2006 | Ziegert et al. | |
| 2007/0101279 A1 | 5/2007 | Chaudhri et al. | |
| 2007/0299869 A1 | 12/2007 | Clary et al. | |
| 2008/0022229 A1* | 1/2008 | Bhumkar .......... | G06F 17/30899 715/838 |
| 2009/0282327 A1 | 11/2009 | Hamilton, II et al. | |
| 2012/0110480 A1* | 5/2012 | Kravets ............. | G06F 17/30905 715/760 |
| 2012/0254292 A1 | 10/2012 | Newton et al. | |

(Continued)

FOREIGN PATENT DOCUMENTS

CN 1987851 A 6/2007

OTHER PUBLICATIONS

M. Florins et al., "Splitting Rules for Graceful Degradation of User Interfaces", ACM, IUI'06, 2004, pp. 1-3.

(Continued)

*Primary Examiner* — Kyle R Stork
(74) *Attorney, Agent, or Firm* — Law Office of Jim Boice

(57) ABSTRACT

A method for loading a web page comprises: searching a web application for user interface change portions, execution of the user interface change portions being capable of triggering a user interface to change; marking the user interface change portions to interrupt, upon execution of the web application, the execution at least once and to execute, upon interruption, at least one of the user interface change portions.

19 Claims, 8 Drawing Sheets

(56) References Cited

U.S. PATENT DOCUMENTS

| | | | |
|---|---|---|---|
| 2012/0303697 A1* | 11/2012 | Alstad | G06F 17/3089 709/203 |
| 2012/0331375 A1* | 12/2012 | Fanning | G06F 17/30896 715/234 |
| 2013/0204841 A1* | 8/2013 | Obusek | G06F 11/14 707/624 |
| 2013/0212465 A1* | 8/2013 | Kovatch | G06F 17/227 715/234 |

OTHER PUBLICATIONS

P. Hilton, "Lazy Loading Page Content With Jquery UI, Ajax, and Play 1.2", Lunatech, Lunatech Blog, Aug. 10, 2011, pp. 1-4.

* cited by examiner

LOADING A WEB PAGE

BACKGROUND

The present invention relates to a data processing field, and more specifically, to a method and system for loading a web page.

With the development of technology, web applications are widely used in various aspects. When using these web applications, users often encounter a problem of browser frozen. Normally, a browser keeps a frozen state by displaying no content or displaying only part of the contents, and displays all contents together at the end of the frozen state.

The above problem of browser frozen is caused mainly by running of a lot of JavaScript programs. During the running Java of the Script program, the user interface cannot be updated so that users always face an incomplete and fixed user interface or a blank user interface until all contents of the user interface are presented together.

SUMMARY

Embodiments of the present invention provide a method and system for loading a web page to avoid the browser from being frozen for a long time.

According to one aspect of the present invention, there is provided a method for loading a web page, the method comprising: searching a web application for user interface change portions, execution of the user interface change portions being capable of triggering a user interface to change; marking the user interface change portions to interrupt, upon execution of the web application, the execution at least once and to execute, upon interruption, at least one of the user interface change portions.

According to another aspect of the present invention, there is provided a system for loading a web page, the system comprising: a searching module configured to search a web application for user interface change portions, execution of the user interface change portions being capable of triggering a user interface to change; a marking module configured to mark the user interface change portions to interrupt, upon execution of the web application, the execution at least once and to execute, upon interruption, at least one of the user interface change portions.

The technical solution provided by the present invention can avoid the browser from being frozen for a long time.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
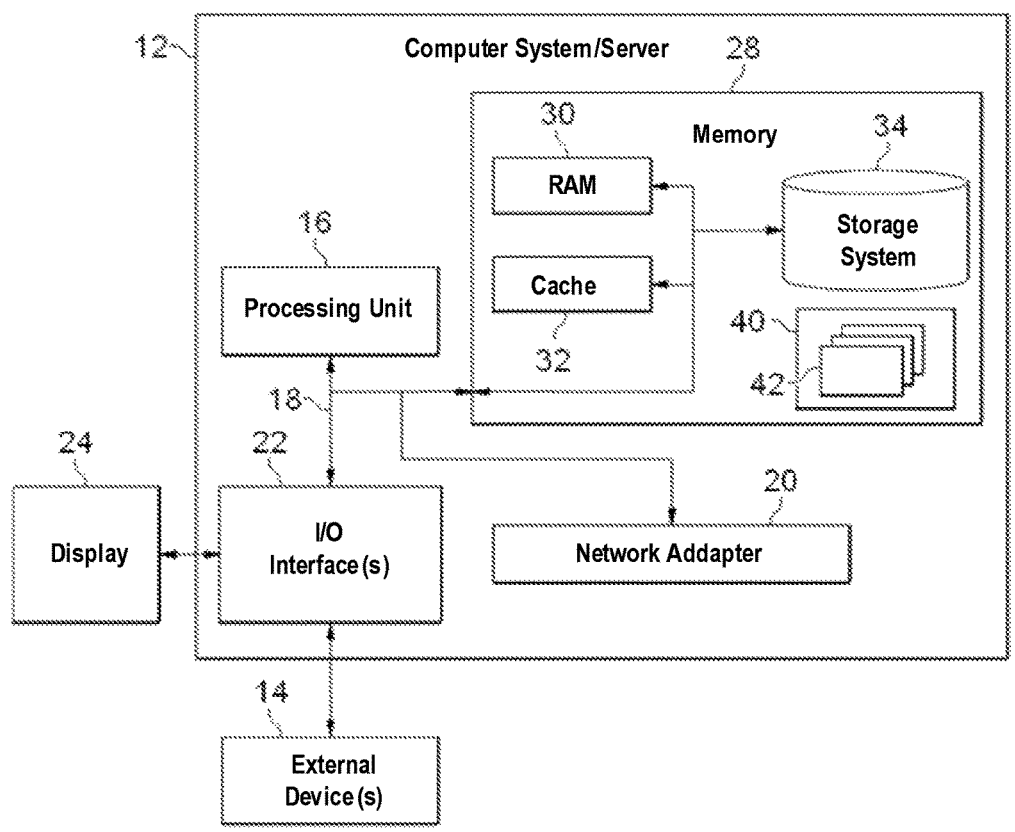
FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, in which a block diagram of an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 and processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
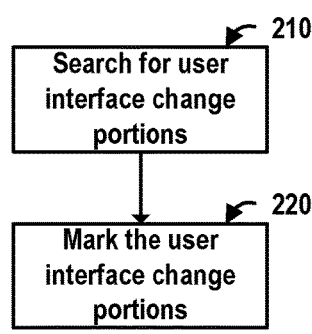
FIG. 2 shows a flow schematic view of a method for loading a web page according to embodiments of the present invention.

With reference now to FIG. 2, one embodiment of the present invention provides a method for loading a web page. The method comprises: step 210 of searching a web application for user interface change portions, execution of the user interface change portions being capable of triggering a user interface to change; step 220 of marking the user interface change portions to interrupt, upon execution of the web application, the execution at least once and to execute, upon interruption, at least one of the user interface change portions.

By employing the method provided in this embodiment, the user interface change portions in the web application may be marked, and the marking can interrupt, upon execution of the web application, the execution of the web application and can execute, upon interruption, the user interface change portions. Thus, the browser freezing caused by a long-term execution of the web application may be avoided so that the user interface can be rendered to users stage by stage. The method provided in this embodiment may improve user experience.

In one embodiment of the present invention, step 210 may be implemented by employing multiple methods, for example, statically scanning a web application to find all user interface change portions. Step 210 may further find user interface change portions by monitoring an event of a DOM (Document Object Model) tree modification, for example, running the web application step by step; monitoring an event of a DOM tree modification corresponding to the web application; if having monitored the event of the DOM tree modification, recording a code corresponding to a changed node as a user interface change portion. In one embodiment of the present invention, changed nodes and their corresponding user interface change portions may be recorded in the form of Table 1, wherein node descriptions, for example, includes the order in which the nodes change.

TABLE 1

Record chart of changed nodes and their corresponding user interface change portions

| User Interface Change Portions | Node Descriptions |
| --- | --- |
| body. append (leftNavigation); | {node: leftNavigation, Index: n} |
| leftnavigation. classname=?; | {node: leftNavigation, Class: "class1", Index: n+1} |
| ... | ... |
| dataTable. style. padding= "5px"; | {node: dataTable, style: "padding: 5px" , Index: n+2} |

Compared with the static scanning manner, recording the user interface change portions by monitoring the event of the DOM tree modification is more convenient and effective, and is beneficial to other DOM tree-based processing.

In one embodiment of the present invention, step 220 for example includes: marking the user interface change portions by setting the user interface change portions as being executed with N unit time delay, wherein N is greater than or equal to 0. For example, the user interface change portions may be placed in the parentheses in setTimeout ( ) to achieve the purpose of marking. For example, the time parameter of setTimeout may be set as infinite, or set as a relative big value so that the user interface change portions may be executed with N unit time delay when encountering the user interface change portions in the execution of the web application. Those skilled in the art may understand that the user interface change portions may also be marked by other manners, such as inserting specific labels before and after the user interface change portions. The user interface change portions may further be marked in a compiling level, such as creating a regular expression list to match typical user interface change codes. Before executing the codes, using the regular expression list to perform a global search to thereby obtain the user interface change code portions. In various embodiments of the present invention, step 220 for example may be executed immediately after having searched the user interface change portions and may also be executed at any time after that.

Figure 3A:
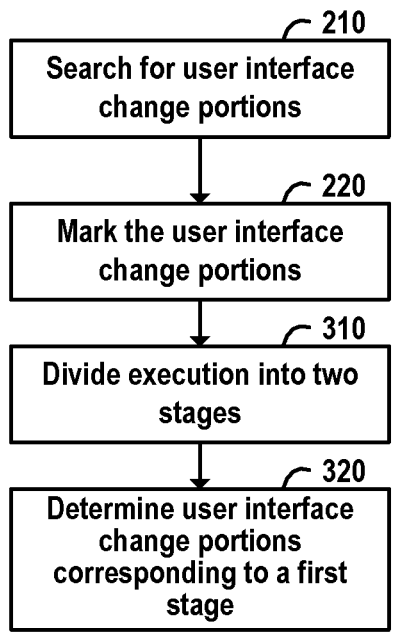
FIG. 3a shows a flow schematic view of a method for loading a web page according to embodiments of the present invention.

As shown in FIG. 3*a*, in one embodiment of the present invention, the method as shown in FIG. 2 may further comprise: step 310 of dividing the execution of the web application into at least two stages; step 320 of determining, from found user interface change portions, a first user interface change portion corresponding to a first stage in the at least two stages. Correspondingly, step 220 comprises: marking the first user interface change portion to interrupt, upon execution of the web application, the execution of the web application after finishing execution of the first stage, and to execute, upon interruption, the first user interface change portion. This embodiment determines and marks, by dividing the execution of the web application into two stages, a first user interface change portion corresponding to a first stage so as to interrupt, upon execution of the web application, the execution of the web application at least after finishing execution of the first stage, and to execute the first user interface change portion. In this embodiment, the first user interface change portion corresponding to the first stage is the user interface change portion that needs to be executed for the user interface that can be rendered after finishing execution of the first stage, or is the user interface change portion that needs to be executed for a part of the user interface that can be rendered after finishing execution of the first stage. In this embodiment, it is unnecessary to execute step 220 and steps 310 and 320 in a specific order for execution, and they may be executed simultaneously and may also be executed successively. Employing the method provided in this embodiment may avoid the browser from being frozen for a long time, and may firstly render at least part of the user interface that can be rendered by executing the first user interface change portion before the entire user interface is rendered to the user.

Figure 3B:
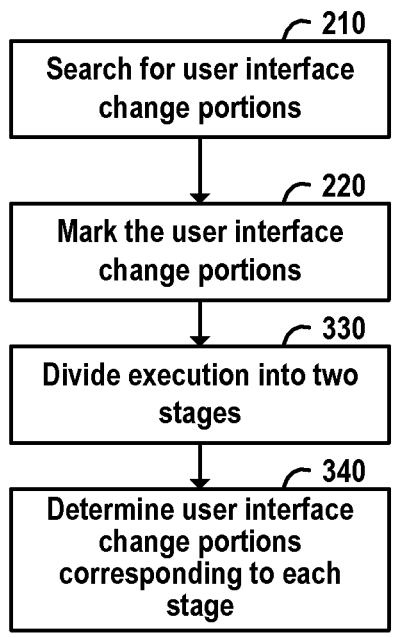
FIG. 3b shows a flow schematic view of a method for loading a web page according to embodiments of the present invention.

As shown in FIG. 3b, in one embodiment of the present invention, the method as shown in FIG. 2 may further comprise: step 330 of dividing the execution of the web application into at least two stages; step 340 of determining, from found user interface change portions, a user interface change portion corresponding to each stage in the at least two stages. Correspondingly, step 220 comprises: marking the user interface change portion corresponding to the each stage to interrupt, upon execution of the web application, the execution of the web application after finishing execution of the each stage, and to execute, upon interruption, the user interface change portion corresponding to the stage. In this embodiment, it is unnecessary to execute step 220 and steps 330 and 340 in a specific order for execution, and they may be executed simultaneously and may also be executed successively. In this embodiment, by dividing the execution of the web application into multiple stages, the user interface change portion corresponding to each stage is determined and marked so as to interrupt, upon execution of the web application, the execution of the web application after finishing execution of each stage, and to execute the user interface change portion corresponding to the stage so that the browser may be avoided from being frozen for a long time, and the user interface may be rendered step by step. Further, in this embodiment, step 330 for example may divide the execution of the web application into at least two stages according to a user-defined manner or other manners that are meaningful to the rendering of the user interface. The manners that are meaningful to the rendering of the user interface, for example, may firstly render a header, a navigation, etc. to let a user learn the general content of the web page and then render more detailed portions. This not only can avoid the browser from being frozen for a long time, but also can render the user interface step by step in a meaningful order or a user desired order.

Figure 5:
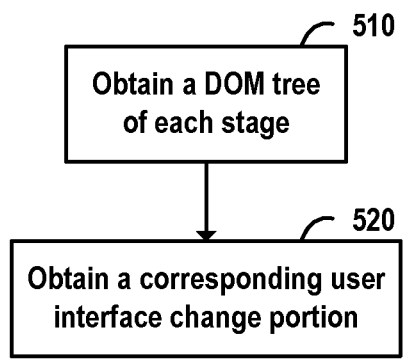
FIG. 5 shows a flow schematic view of a method for obtaining a user interface change portion corresponding to each stage according to embodiments of the present invention.

In one embodiment of the present invention, in step 320 and step 340, determining the user interface change portions corresponding to stages may be implemented, for example, by employing a static scanning comparison manner or by employing the method as shown in FIG. 5. The method as shown in FIG. 5 comprises: step 510 of obtaining a DOM tree of each stage; step 520 of obtaining user interface change portions corresponding to nodes included in the DOM tree of each stage. In one embodiment of the present invention, if the corresponding relation between the DOM tree nodes and the user interface change portions as shown in Table 1 is obtained in step 210 or in other steps and procedures, then step 520 may be obtaining a user interface change portion corresponding to the stage by comparing the description of nodes of the DOM tree of each stage and the description of nodes in Table 1.

In one embodiment of the present invention, in order to be convenient for recording, it is possible to index the found user interface change portions and record, after determining the user interface change portion corresponding to each stage, the corresponding relation. When recording the corresponding relation, it is possible to use the index of the user interface change portions for recording. For example, it is possible to index a user interface change portion by using the serial numbers of the nodes corresponding to the user interface change portions. Please refer to Table 2 which is a record chart of the corresponding relation between the user interface change portions and the DOM tree nodes.

TABLE 2

Record chart of the corresponding relation between the user interface change portions and the DOM tree nodes

| User Interface Change Portions | Node Descriptions |
| --- | --- |
| body. append (leftNavigation); | {node: leftNavigation, description: ... , Index: 7} |
| ... | ... |
| body. append (contentContainer); | {node: contentContainer, description: ... , Index: 2} |
| ... | ... |
| showTopMenu ( ); | {node: topmenu, description: ... , Index: 6} |

In one embodiment of the present invention, steps 310 and 320 for example include: dividing an entire user interface resulted from the execution of the web application, into at least two portions; dividing the execution of the web application into at least two stages based on the at least two portions of the entire user interface, wherein a corresponding portion of the entire user interface can be rendered after finishing execution of each stage in the at least two stages. In this embodiment, dividing the execution of the web application into multiple portions can be implemented by dividing the user interface into multiple portions. For example, the entire user interface resulted from the execution of the web application may be divided into 4 portions, i.e. portion A, portion B, portion C and portion D, wherein portion A includes Header; portion B includes Main Content and Left Navigation; portion C includes Top Menu; and portion D includes Content Data Table. According to portions A, B, C and D, the execution of the web application is divided into 4 stages, wherein portion A can be rendered after finishing the execution of stage 1; portion B can be rendered after finishing the execution of stage 2; portion C can be rendered after finishing the execution of stage 3; and portion D can be rendered after finishing the execution of stage 4. Those skilled in the art may understand that the execution stage may include only execution of a code used to render a user interface of a corresponding portion, and may also include more codes as long as the user interface of the corresponding portion can be rendered after finishing the execution of the stage. For example, stage 1 may include only execution of a code used to render portion A, and may also include more executions of codes as long as Header can be rendered after finishing the execution of stage 1. Dividing the execution into at least tow stages can be implemented by dividing the entire user interface into portions so that the division of stages can better reflect the changes of the user interface. Those skilled in the art may understand that other manners may also be employed to divide the stages, for example, according to lines of code, the web application is divided into at least two portions and the execution of each portion is a stage.

In one embodiment of the present invention, the step of dividing an entire user interface resulted from the execution of the web application, into at least two portions may comprise one of: dividing an entire user interface resulted from the execution of the web application, into at least two portions according to a rule of displaying a frame before content; and dividing an entire user interface resulted from the execution of the web application, into at least two portions according to a user-defined display order. This embodiment provides an example of dividing an entire user interface into multiple portions according to the display order. For example, a user hopes to display the following elements successively: Header, Top Menu, Main Content and Left Navigation, and Content Data Table. Then, the entire user interface may be divided into four portions each including corresponding elements above. With the method provided in this embodiment, dividing the execution stages may be implemented by dividing the user interface, which is more direct and convenient for the user. Furthermore, dividing the execution stages by dividing the user interface may render the user interface according to a meaningful order, and may enable, at the same time of avoiding the browser from being frozen for a long time, a user to see the user interface step by step according to a meaningful order.

Figure 4:
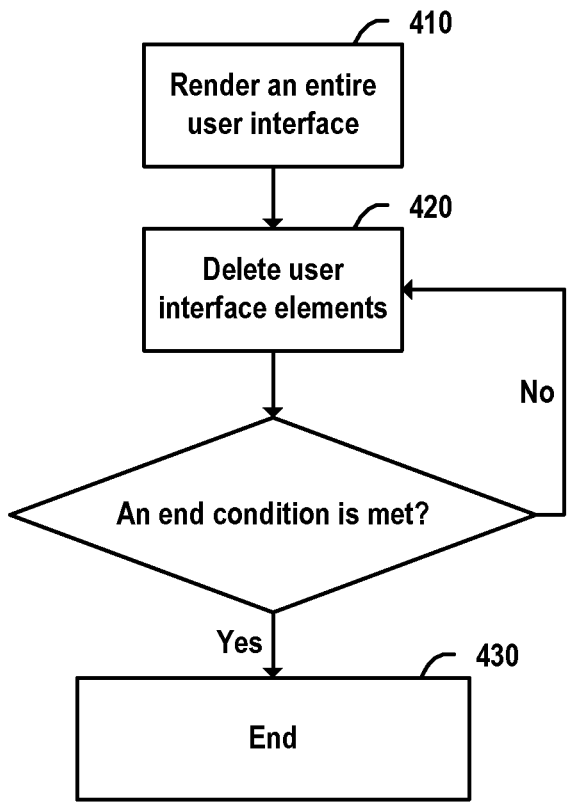
FIG. 4 shows a flow schematic view of a method for dividing a user interface into multiple portions according to embodiments of the present invention.

In one embodiment of the present invention, dividing an entire user interface resulted from the execution of the web application, into at least two portions according to a user-defined display order may be implemented by the following method: step 410 of rendering to a user an entire user interface resulted from the execution of the web application; step 420 of receiving an input of the user, the input used to delete part of the user interface elements in the entire user interface; step 430 of ending the method if the end condition is met, wherein step 420 may be executed repeatedly until the end condition is met, then the method ends. The end condition for example may include at least one of: all user interface elements are deleted; user input ends; a preset repeated number of step 420 is reached. By applying the method as shown in FIG. 4, the user interface elements deleted each time constitute a portion so as to divide the entire user interface into multiple portions. Those skilled in the art may understand that if the repeated number of step 420 reaches a preset value and ends or the user input ends, and there are still user interface elements that are not deleted, then these remained user interface elements constitute a portion. Especially, with the method provided in this embodiment, a user may delete user interface elements in order, for example, the user interface elements desired to be displayed last may be deleted first, and thus the display order of part of the user interface may be defined at the same time.

In one embodiment of the present invention, a user interface change portion corresponding to each stage may be recorded. For example, an index of the DOM tree nodes may be employed as an index of the corresponding user interface change portions. The content shown in Table 2 is taken as an example, an index of body. append (contentContainer) is 2; an index of showTopMenu ( ) is 6; and an index of body. append (leftNavigation) is 7. In order to be convenient for recording, the index of the user interface change portions may be employed to record the user interface change portion corresponding to each stage. For example, the second stage needs show Top Menu, Left Navigation and Main Content. Then, the user interface change portions corresponding to the second stage may be recorded as 2, 6 and 7. For example, if the execution of the web application is divided into 4 stages, then the user interface change portion corresponding to each stage may be recorded in a manner as shown in Table 3.

TABLE 3

Corresponding relation table between the web application execution stages and the user interface change portions.

| Execution Stages | Indexes of User Interface Change Portions |
| --- | --- |
| Stage 1 | 1 |
| Stage 2 | 2, 6, 7 |
| Stage 3 | 3, 8 |
| Stage 4 | 4, 5 |

In one embodiment of the present invention, in the embodiment as shown in FIG. 2, the method may further comprise: when encountering a marked portion in the execution of the web application, interrupting the execution of the web application and executing the marked portion. With the method provided in this embodiment, it is possible to interrupt the execution of the web application and execute user interface change portions, thereby avoiding the browser from being frozen for a long time.

In one embodiment of the present invention, in the embodiment as shown in FIG. 3a, the method may further comprise: when encountering a marked portion in the execution of the web application, listing the marked portion in a ready queue; if the ready queue includes all of the first user interface change portions, interrupting the execution of the web application and executing the all of the first user interface change portions; otherwise, continuing the execution of the web application by skipping the marked portion. In this embodiment, listing the marked portion in the ready queue may be placing all codes of the entire marked portion into the ready queue, and may also be placing an index of the marked portion; the ready queue may be an individual queue, and may also be implemented by adding corresponding sequence symbols to the original codes or by other manners. Determining whether the ready queue includes all of the first user interface change portions, for example, may be determining whether the last one of the first user interface change portions is in the queue; or the first user interface change portions encountered in the execution may be counted, and when the counting reaches the number of the first user interface change portions, it is determined that the ready queue includes all of the first user interface change portions. Those skilled in the art may understand that other methods may also be employed to determine whether the ready queue includes all of the user interface change portions. It can be seen that with the method provided in this embodiment, it is possible to interrupt the execution of the web application and to execute, upon interruption, the user interface change portions so as to render the user interface to the user step by step and avoid the browser from being frozen for a long time.

In one embodiment of the present invention, the method as shown in FIG. 3b may further comprise: step 610 of, when encountering a marked portion in the execution of the web application, if the marked portion corresponds to a current stage, listing the marked portion in a ready queue; step 620 of, otherwise, listing the marked portion in a candidate queue; step 630 of, in response to the marked portion being listed in the ready queue, if the ready queue includes all user interface change portions corresponding to a current stage, interrupting the execution of the web application and executing the all user interface change portions corresponding to the current stage; step 640 of, otherwise, continuing the execution of the web application by skipping the marked portion; step 650 of, in response to the marked portion being listed in the candidate queue, continuing the execution of the web application by skipping the marked portion. In this embodiment, based on the table as shown in Table 3 for example, it may be determined that whether the marked portion belongs to the current execution stage and whether the ready queue includes all of the user interface change portions corresponding to the current stage. For example, if the current stage is stage 2, it may be determined that whether the user interface change portion with an index of 7 is included in the ready queue, and if so, then the ready queue has included all of the user interface change portions corresponding to the current stage. This is because the user interface change portions are indexed by employing the index of the DOM tree nodes, while the index of the DOM tree nodes is based on the order of the changes of the DOM tree nodes. In this embodiment, the ready queue and the candidate queue may be individual queues, and may also be implemented by modifying the codes of the web application, or by other manners; correspondingly, the present invention does not limit the manner of listing the user interface change portions in a queue. With the method provided in this embodiment, it is possible to interrupt the execution of the web application and to execute, upon interruption, the user interface change portions so as to render the user interface to the user step by step and avoid the browser from being frozen for a long time. By setting the ready queue and the candidate queue, it is possible to render, after finishing the execution of each stage, a corresponding user interface to the users so as to render the user interface to the user step by step according to a meaningful order at the same time of avoiding the browser from being frozen for a long time.

Figure 6:
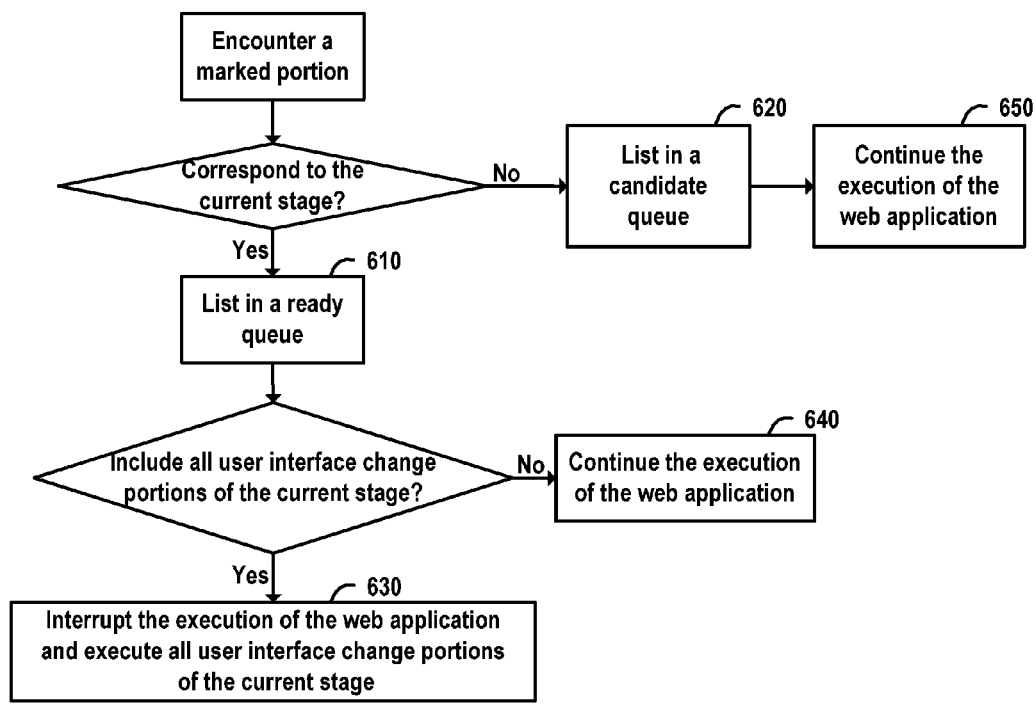
FIG. 6 shows a flow schematic view of a method for loading a web page according to embodiments of the present invention.

In one embodiment of the present invention, the embodiment as shown in FIG. 6 further comprises: when starting execution of the each stage, in response to the candidate queue including user interface change portions corresponding to a current stage, moving the user interface change portions corresponding to the current stage from the candidate queue to the ready queue.

Figure 7:
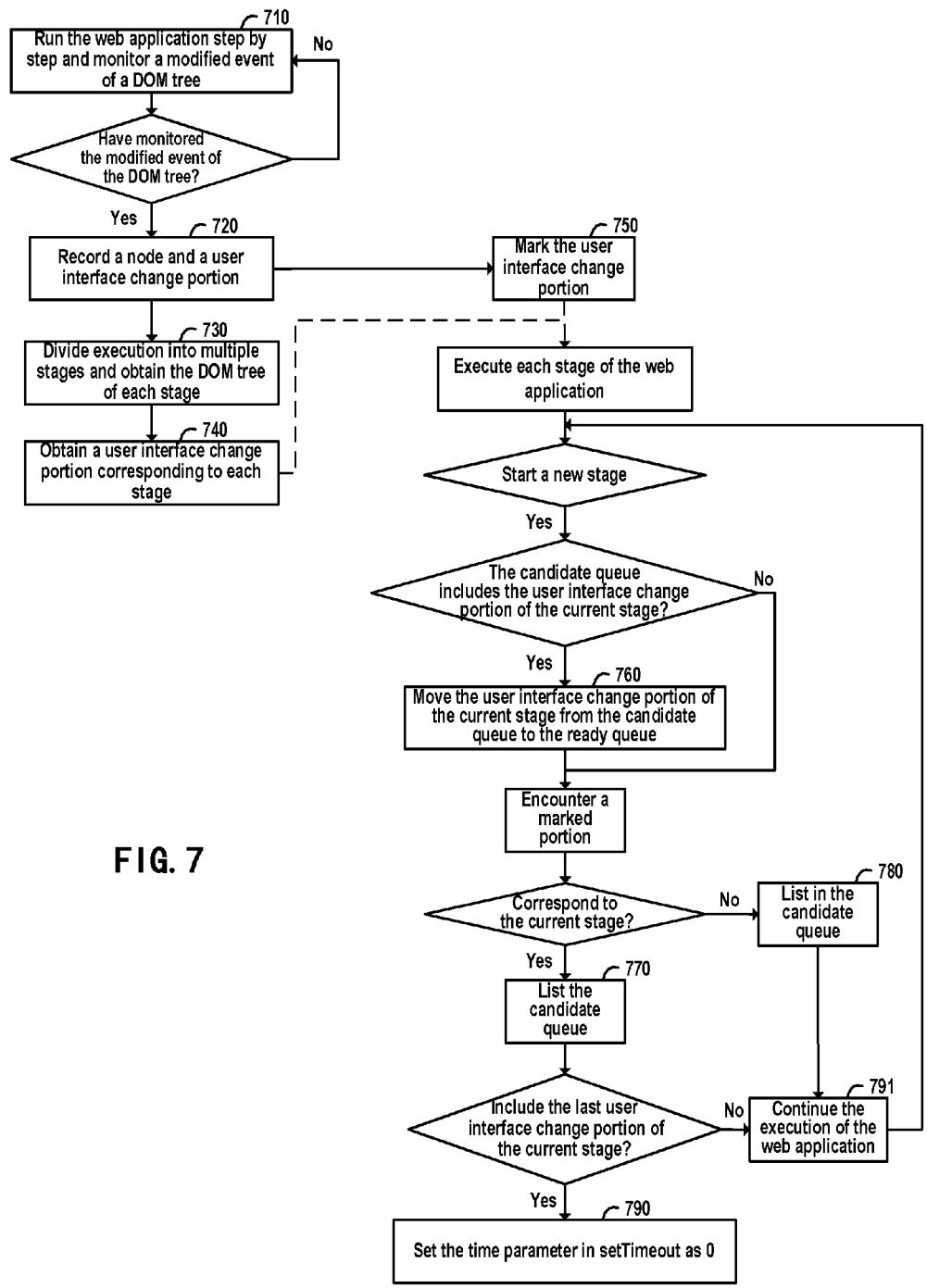
FIG. 7 shows a flow schematic view of a method for loading a web page according to embodiments of the present invention.
Figure 8A:
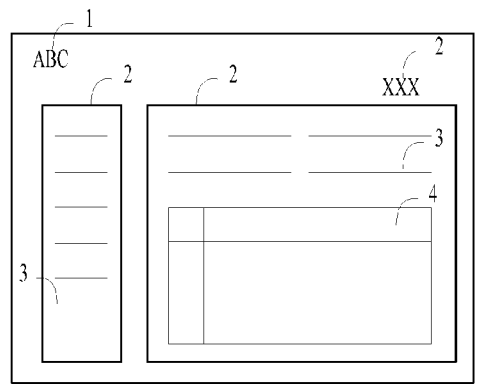
FIGS. 8a-8d respectively show a user interface schematic view of dividing a user interface into multiple portions by deleting user interface elements according to embodiments of the present invention.
Figure 8B:
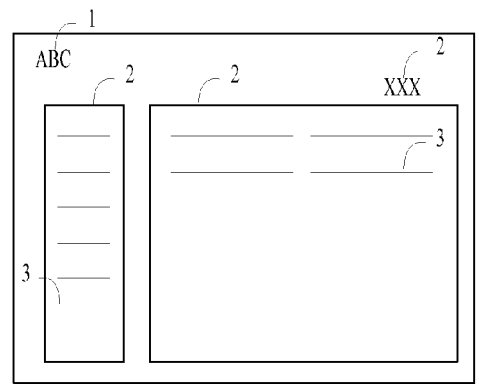
Figure 8C:
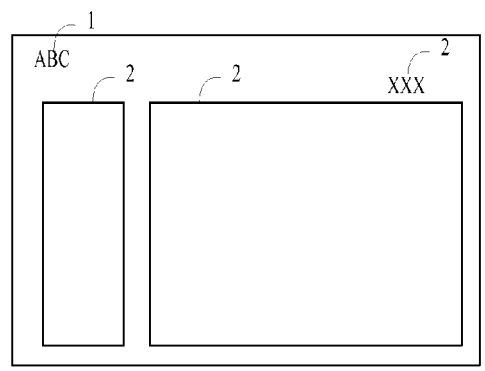
Figure 8D:
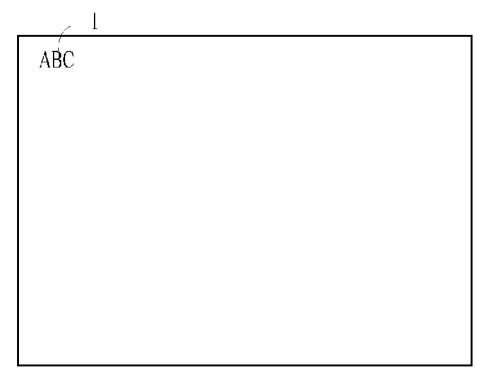

Take, for example, marking a user interface change portion by using setTimeout ( ), the combined examples of the above embodiments in the present invention are described in detail. As shown in FIG. 7, step 710 is that while running the web application step by step, the user interface updates a monitor to monitor an event of a DOM tree modification corresponding to the web application. Step 720 is, in response to having monitored the event of the DOM tree modification, recording a changed node and recording a code corresponding to the changed node as a user interface change portion. Step 730 is dividing, by deleting user interface elements from an entire user interface, the entire user interface into multiple portions and obtaining multiple execution stages corresponding to the multiple portions so as to divide the execution of the web application into multiple stages and obtain a DOM tree of each stage. FIG. 8a shows a user interface corresponding to stage 4. FIG. 8b shows a user interface corresponding to stage 3. It can be learned by comparing FIG. 8a with FIG. 8b that the user interface corresponding to stage 3 may be obtained by deleting the user interface element marked as 4. FIG. 8c shows a user interface corresponding to stage 2. It can be learned by comparing FIG. 8b with FIG. 8c that the user interface corresponding to stage 2 may be obtained by deleting the user interface element marked as 3. FIG. 8d shows a user interface corresponding to stage 1. It can be learned by comparing FIG. 8d with FIG. 8c that the user interface corresponding to stage 1 may be obtained by deleting the user interface element marked as 2. Step 740 is obtaining, by comparing the DOM tree of each stage with the changed node as recorded in step 720, a user interface change portion corresponding to each stage, for example, obtaining the user interface change portion corresponding to each stage as shown in Table 3. Step 750 is using setTimeout ( ) to mark the user interface change portion and setting the time parameter of setTimeout as the maximum. It may be understood that step 750 may be executed simultaneously with step 720, and may also be executed at any time thereafter. Step 760 is executing a web application, and at the beginning of each stage, in response to the candidate queue having a user interface change portion corresponding to the current stage, moving the user interface change portion corresponding to the current stage from the candidate queue to the ready queue. Step 760 may be executed after step 750 and may also be executed after step 740. Step 770 is, in response to encountering the portion parenthesized by setTimeout, if the portion is the user interface change portion corresponding to the current stage, listing the portion in a ready queue. Step 780 is, otherwise, listing it in a candidate queue. Step 790 is, in response to the portion being listed in the ready queue, if the ready queue includes the last user interface change portion of the current stage, setting the time parameter of setTimeout of all user interface change portions in the ready queue as 0, that is, interrupting the execution of the web application and executing all user interface change portions corresponding to the current stage; otherwise, step 791 is executed. Step 791 is continuing the execution of the web application by skipping this portion. With the method provided in this embodiment, it is possible to avoid the browser from being frozen for a long time without the developer's additional work in the developing stage in a case that the original web application is modified as less as possible. Furthermore, in step 730, the user interface elements may be deleted according to a meaningful order and thus in display, the user interface may be rendered to the user step by step according to a meaningful order so as to improve the user experience.

The above method embodiments of the present invention may refer to each other to obtain more embodiments, which is not detailed here.

Figure 9:
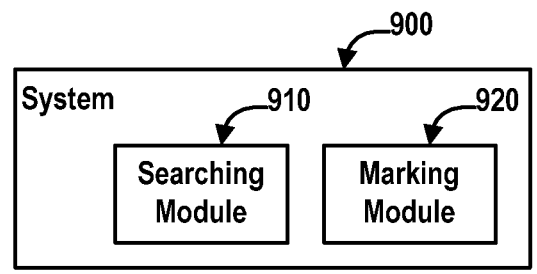
FIG. 9 shows a structural schematic view of a system for loading a web page according to embodiments of the present invention.

As shown in FIG. 9, embodiments of the present invention provide a system 900 for loading a web page. Note that in one embodiment of the present invention, all modules and/or sub-modules depicted in FIG. 9 and other figures herein are hardware modules/sub-modules, that are specifically designed to perform one or more particular functions (e.g., are a field programmable gate array—FPGA, a custom chip containing circuitry to perform one or more specific functions, etc.)

The system 900 comprises: a searching module 910 configured to search a web application for user interface change portions, execution of the user interface change portions being capable of triggering a user interface to change; a marking module 920 configured to mark the user interface change portions to interrupt, upon execution of the web application, the execution at least once and to execute, upon interruption, at least one of the user interface change portions. With the system 900 provided in this embodiment, it is possible to interrupt the execution of the web application at least once and to execute, upon interruption, the user interface change portions so as to display part of the user interface to avoid the browser from being frozen for a long time. Thus, when loading a web page, the user may see the change of the user interface to thereby improve the user experience.

In one embodiment of the present invention, the searching module 910 comprises: a running sub-module configured to run the web application step by step; a monitoring sub-module configured to monitor an event of a DOM tree modification corresponding to the web application; a recording sub-module configured to, if having monitored the event of the DOM tree modification, record a code corresponding to a changed node as a user interface change portion. Those skilled in the art may understand that the searching module 910 may also be implemented by other technology, and specifically the above method embodiments may be referred to, which is not detailed here.

In one embodiment of the present invention, the marking module 920 is further configured to mark the user interface change portions by setting the user interface change portions as being executed with N unit time delay, wherein N is greater than or equal to 0. It may be understood that the marking module 920 may further employ other technology to mark the user interface change portions, and specifically the above method embodiments may be referred to, which is not detailed here.

Figure 10:
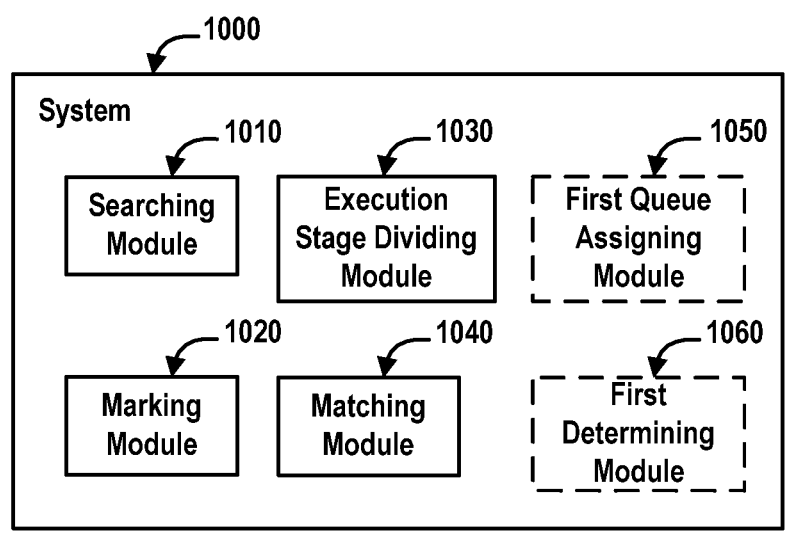
FIG. 10 shows a structural schematic view of a system for loading a web page according to embodiments of the present invention.

In one embodiment of the present invention, as shown in FIG. 10, the system 1000 may comprise a searching module 1010, a marking module 1020, execution stage dividing module 1030 and a matching module 1040, wherein the searching module 1010 may refer to the searching module 910 in the embodiment as shown in FIG. 9. The marking module 1020 is configured to mark a first user interface change portion so as to interrupt, upon execution of the web application, the execution of the web application after finishing execution of the first stage, and to execute, upon interruption, the first user interface change portion. The execution stage dividing module 1030 is configured to divide the execution of the web application into at least two stages. The matching module 1040 is configured to determine, from found user interface change portions, the first user interface change portion corresponding to a first stage in the at least two stages.

Figure 11:
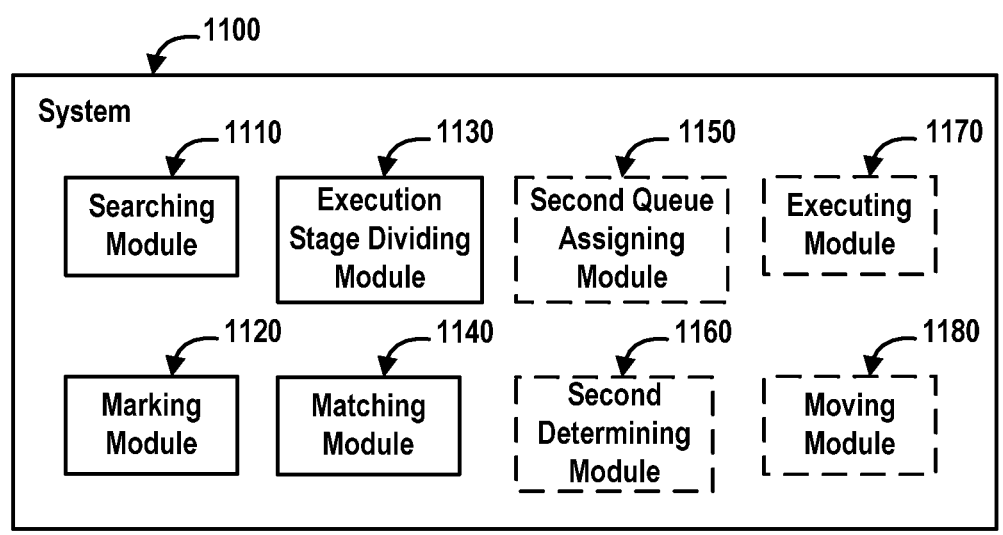
FIG. 11 shows a structural schematic view of a system for loading a web page according to embodiments of the present invention.

In one embodiment of the present invention, as shown in FIG. 11, the system 1100 may comprise: a searching module 1110, a marking module 1120, execution stage dividing module 1130 and a matching module 1140, wherein the searching module 1110 may refer to the searching module 910 in the embodiment as shown in FIG. 9. The marking module 1120 is configured to mark a user interface change portion corresponding to each stage so as to interrupt, upon execution of the web application, the execution of the web application after finishing execution of the each stage, and to execute, upon interruption, the user interface change portion corresponding to the stage. The execution stage dividing module 1130 is configured to divide the execution of the web application into at least two stages. The matching module 1140 is configured to determine, from found user interface change portions, the user interface change portion corresponding to each stage in the at least two stages.

In one embodiment of the present invention, the execution stage dividing module in the embodiment as shown in FIG. 10 or FIG. 11 is further configured to divide an entire user interface resulted from the execution of the web application, into at least two portions, and to divide the execution of the web application into at least two stages based on the at least two portions of the entire user interface, wherein a corresponding portion of the entire user interface can be rendered after finishing execution of each stage in the at least two stages. Further, in one embodiment of the present invention, the execution stage dividing module dividing an entire user interface resulted from the execution of the web application, into at least two portions may specifically comprise one of: the execution stage dividing module dividing an entire user interface resulted from the execution of the web application, into at least two portions according to a rule of displaying a frame before content; and the execution stage dividing module dividing an entire user interface resulted from the execution of the web application, into at least two portions according to a user-defined display order.

In one embodiment of the present invention, the system 1000 as shown in FIG. 10 may further comprise: a first queue assigning module 1050 configured to, when encountering a marked portion in the execution of the web application, list the marked portion in a ready queue; a first determining module 1060 configured to, if the ready queue includes all of the first user interface change portions, interrupt the execution of the web application and execute the all of the first user interface change portions; otherwise, continue the execution of the web application by skipping the marked portion.

In one embodiment of the present invention, the system 1100 as shown in FIG. 11 may further comprise: a second queue assigning module 1150 configured to, when encountering a marked portion in the execution of the web application, if the marked portion corresponds to a current stage, list the marked portion in a ready queue; otherwise, list the marked portion in a candidate queue; a second determining module 1160 configured to, in response to the marked portion being listed in the ready queue, if the ready queue includes all user interface change portions corresponding to a current stage, interrupt the execution of the web application and execute the all user interface change portions corresponding to the current stage; otherwise, continue the execution of the web application by skipping the marked portion; an executing module 1170 configured to, in response to the marked portion being listed in the candidate queue, continue the execution of the web application by skipping the marked portion.

In one embodiment of the present invention, the system 1100 as shown in FIG. 11 may further comprise: a moving module 1180 configured to, when starting execution of the each stage, in response to the candidate queue including user interface change portions corresponding to a current stage, move the user interface change portions corresponding to the current stage from the candidate queue to the ready queue.

The implementation details in the above apparatus embodiments may refer to corresponding method embodiments. The above apparatus embodiments may refer to each other to obtain more apparatus embodiments, which is not detailed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, as described herein, one or more embodiments of the present invention relates to a data processing field, and disclose a method and system for loading a web page. The method for loading a web page comprises: searching a web application for user interface change portions, execution of the user interface change portions being capable of triggering a user interface to change; marking the user interface change portions to interrupt, upon execution of the web application, the execution at least once and to execute, upon interruption, at least one of the user interface change portions. Employing the method and system provided by the present invention can interrupt the execution of the web application and load the user interface step by step, thereby avoiding a browser from being frozen for a long time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for loading a web page, the method comprising:
    searching, by one or more processors, a web application for user interface change portions, wherein execution of the user interface change portions triggers a user interface to change, and wherein the web application is renderable on the user interface as a web page by a browser;
    marking, by one or more processors, the user interface change portions to interrupt, upon execution of the web application, the execution of the web application;
    interrupting, by one or more processors, execution of the web application upon an initial execution of the web application;
    displaying, by one or more processors, the user interface change portions;
    displaying, by one or more processors, other portions of the web page at an N unit time delay after a time that the user interface change portions are displayed;
    storing, by one or more processors, code for identified user interface change portions from the web page in a ready queue;
    storing, by one or more processors, code for the other portions of the web page in a candidate queue, wherein the ready queue and the candidate queue are different queues;
    retrieving and executing, by one or more processors, the code for the identified user interface change portions from the ready queue in order to display the identified user interface change portions of the web page;
    in response to retrieving and executing the code from the ready queue in order to display the identified user interface change portions of the web page, moving, by one or more processors, the code for the other portions of the web page from the candidate queue to the ready queue; and
    retrieving and executing, by one or more processors, the code in the ready queue for the other portions in order to display the other portions of the web page.

2. The method according to claim 1, further comprising:
    running, by one or more processors, the web application step by step;
    monitoring, by one or more processors, an event of a document object model (DOM) tree modification in a DOM tree corresponding to the web application; and
    recording, in response to one or more processors having detected the event of the DOM tree modification, a code corresponding to a changed node in the DOM tree as the user interface change portion.

3. The method according to claim 1, wherein the N unit time delay is greater than 0.

4. The method according to claim 1, wherein the N unit time delay is infinity.

5. The method according to claim 1, further comprising:
    listing, by one or more processors, in response to encountering a marked portion in the execution of the web application, the marked portion of the web page in a marked portion ready queue; and
    in response to the marked portion ready queue including all content for the marked portion of the web page, retrieving, by one or more processors, the content for the marked portion from the marked portion ready queue for display in the marked portion of the web page.

6. The method according to claim 1, wherein code for the user interface change portions is marked with a predefined label that identifies the user interface change portions and code for the other portions of the web page that do not change the web page are not marked with the predefined label, and wherein the method further comprises:
    performing, by one or more processors and before executing the web application, a global search of the web application for the code for the user interface change portions that is marked with the predefined label;
    retrieving, by one or more processors, the code that is marked with the predefined label;
    executing, by one or more processors, the code that is marked with the predefined label before executing the code that is not marked with the predefined label.

7. The method according to claim 1, wherein portions of the web page are designed to be loaded onto the user interface in sequential stages, wherein each of the sequential stages corresponds to a different portion of the web page, and wherein the method further comprises:
    determining, by one or more processors, whether all user interface change portions corresponding to a first stage from the sequential stages are in a change ready queue of user interface change portions that are ready to be installed on the user interface, wherein user interface change portions corresponding to the first stage are designed to be implemented before user interface change portions corresponding to a second stage that is subsequent to the first stage;
    in response to determining that all user interface change portions corresponding to the first stage are not in the change ready queue, determining, by one or more processors, whether all user interface change portions corresponding to the second stage are in the change ready queue; and in response to determining that all user interface change portions corresponding to the second stage are in the change ready queue, skipping execution of the user interface change portions corresponding to the first stage and executing, by one or more processors, user interface change portions that are designed to be executed during the second stage.

8. The method of claim 1, wherein portions of the user interface are displayed in a successive manner in order to prevent a browser that displays the web application from freezing, and wherein the method further comprises:

displaying, by one or more processors, a header for the web application on the user interface;

subsequent to displaying the header for the web application on the user interface, displaying, by one or more processors, a top menu for the web application on the user interface;

subsequent to displaying the top menu for the web application on the user interface, displaying, by one or more processors, a main content and a left navigation pane for the web application on the user interface; and subsequent to displaying the main content and the left navigation pane of the web application on the user interface, displaying, by one or more processors, a content table for the web application on the user interface.

9. The method according to claim 1, further comprising:

identifying, by one or more processors, an order in which portions of the other portions of the web page are to be displayed;

identifying, by one or more processors, a last portion of the web page, wherein the last portion is to be displayed after all other portions of the web page are displayed; and deleting, by one or more processors, the last portion of the web page before deleting one or more of the all other portions of the web page.

10. The method according to claim 1, further comprising:

storing, by one or more processors, code for identified user interface change portions from the web page in a change ready queue;

storing, by one or more processors, code for the other portions of the web page in a candidate queue, wherein the change ready queue and the candidate queue are different queues;

retrieving and executing, by one or more processors, the code from the change ready queue in order to display the identified user interface change portions of the web page; and retrieving and executing, by one or more processors, the code from the candidate queue in order to display the other portions of the web page.

11. A computer system comprising one or more processors, one or more computer readable memories, one or more computer readable storage mediums, and program instructions stored on at least one of the one or more computer readable storage mediums for execution by at least one of the one or more processors via at least one of the one or more computer readable memories, the stored program instructions comprising:

program instructions to search a web application for user interface change portions, wherein execution of the user interface change portions triggers a user interface to change, and wherein the web application is renderable on the user interface as a web page by a browser;

program instructions to mark the user interface change portions to interrupt, upon execution of the web application, the execution of the web application;

program instructions to interrupt execution of the web application upon an initial execution of the web application;

program instructions to display the user interface change portions;

program instructions to display other portions of the web page at an N unit time delay after a time that the user interface change portions are displayed;

program instructions to store code for identified user interface change portions from the web page in a ready queue;

program instructions to store code for the other portions of the web page in a candidate queue, wherein the ready queue and the candidate queue are different queues;

program instructions to retrieve and execute the code for the identified user interface change portions from the ready queue in order to display the identified user interface change portions of the web page;

program instructions to, in response to retrieving and executing the code from the ready queue in order to display the identified user interface change portions of the web page, move the code for the other portions of the web page from the candidate queue to the ready queue; and program instructions to retrieve and execute the code in the ready queue for the other portions in order to display the other portions of the web page.

12. The computer system according to claim 11, further comprising:

program instructions to run the web application step by step;

program instructions to monitor an event of a document object model (DOM) tree modification in a DOM tree corresponding to the web application; and program instructions to record, in response to one or more processors having detected the event of the DOM tree modification, a code corresponding to a changed node in the DOM tree as the user interface change portion.

13. The computer system according to claim 11, wherein the N unit time delay is greater than 0.

14. The computer system of claim 11, wherein portions of the web page are designed to be loaded onto the user interface in sequential stages, wherein each of the sequential stages corresponds to a different portion of the web page, further comprising:

program instructions to determine whether all user interface change portions corresponding to a first stage from the sequential stages are in a change ready queue of user interface change portions that are ready to be installed on the user interface, wherein user interface change portions corresponding to the first stage are designed to be implemented before user interface change portions corresponding to a second stage that is subsequent to the first stage;

program instructions to, in response to determining that all user interface change portions corresponding to the first stage are not in the change ready queue, determine whether all user interface change portions corresponding to the second stage are in the change ready queue; and program instructions to, in response to determining that all user interface change portions corresponding to the second stage are in the change ready queue, execute user interface change portions that are designed to be executed during the second stage.

15. The computer system of claim 11, wherein portions of the user interface are displayed in a successive manner in order to prevent a browser that displays the web application from freezing, further comprising:
program instructions to display a header for the web application on the user interface;
program instructions to, subsequent to displaying the header for the web application on the user interface, display a top menu for the web application on the user interface;
program instructions to, subsequent to displaying the top menu for the web application on the user interface, display a main content and a left navigation pane for the web application on the user interface; and
program instructions to, subsequent to displaying the main content and the left navigation pane of the web application on the user interface, display a content table for the web application on the user interface.

16. A computer program product for loading a web page, the computer program product comprising a computer readable storage medium having program code embodied therewith, the program code readable and executable by a processor to perform a method comprising:
searching a web application for user interface change portions, wherein execution of the user interface change portions triggers a user interface to change, and wherein the web application is renderable on the user interface as a web page by a browser;
marking the user interface change portions to interrupt, upon execution of the web application, the execution of the web application;
interrupting execution of the web application upon an initial execution of the web application;
displaying the user interface change portions;
displaying other portions of the web page at an N unit time delay after a time that the user interface change portions are displayed;
storing code for identified user interface change portions from the web page in a ready queue;
storing code for the other portions of the web page in a candidate queue, wherein the ready queue and the candidate queue are different queues;
retrieving and executing the code for the identified user interface change portions from the ready queue in order to display the identified user interface change portions of the web page;
in response to retrieving and executing the code from the ready queue in order to display the identified user interface change portions of the web page, moving the code for the other portions of the web page from the candidate queue to the ready queue; and
retrieving and executing the code in the ready queue for the other portions in order to display the other portions of the web page.

17. The computer program product of claim 16, wherein the method further comprises:
running the web application step by step;
monitoring an event of a document object model (DOM) tree modification in a DOM tree corresponding to the web application; and
recording, in response to one or more processors having detected the event of the DOM tree modification, a code corresponding to a changed node in the DOM tree as the user interface change portion.

18. The computer program product of claim 16, wherein portions of the web page are designed to be loaded onto the user interface in sequential stages, wherein each of the sequential stages corresponds to a different portion of the web page, and wherein the method further comprises:
determining whether all user interface change portions corresponding to a first stage from the sequential stages are in a change ready queue of user interface change portions that are ready to be installed on the user interface, wherein user interface change portions corresponding to the first stage are designed to be implemented before user interface change portions corresponding to a second stage that is subsequent to the first stage;
in response to determining that all user interface change portions corresponding to the first stage are not in the change ready queue, determining whether all user interface change portions corresponding to the second stage are in the change ready queue; and
in response to determining that all user interface change portions corresponding to the second stage are in the change ready queue, executing user interface change portions that are designed to be executed during the second stage.

19. The computer program product of claim 16, wherein portions of the user interface are displayed in a successive manner in order to prevent a browser that displays the web application from freezing, and wherein the method further comprises:
displaying a header for the web application on the user interface;
subsequent to displaying the header for the web application on the user interface, displaying a top menu for the web application on the user interface;
subsequent to displaying the top menu for the web application on the user interface, displaying a main content and a left navigation pane for the web application on the user interface; and
subsequent to displaying the main content and the left navigation pane of the web application on the user interface, displaying a content table for the web application on the user interface.

* * * * *